US008743575B2

(12) United States Patent
Nymand

(10) Patent No.: US 8,743,575 B2
(45) Date of Patent: Jun. 3, 2014

(54) SWITCH MODE PULSE WIDTH MODULATED DC-DC CONVERTER WITH MULTIPLE POWER TRANSFORMERS

(75) Inventor: Morten Nymand, Odense (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 687 days.

(21) Appl. No.: 12/452,796

(22) PCT Filed: Jul. 18, 2008

(86) PCT No.: PCT/DK2008/000274
§ 371 (c)(1),
(2), (4) Date: Jan. 22, 2010

(87) PCT Pub. No.: WO2009/012778
PCT Pub. Date: Jan. 29, 2009

(65) Prior Publication Data
US 2010/0128498 A1    May 27, 2010

Related U.S. Application Data

(60) Provisional application No. 60/935,070, filed on Jul. 25, 2007.

(30) Foreign Application Priority Data

Jul. 25, 2007  (EP) .................................... 07388057

(51) Int. Cl.
*H02M 3/335*   (2006.01)
(52) U.S. Cl.
USPC .............................................. 363/65; 363/17
(58) Field of Classification Search
USPC .............................. 363/65, 71, 72, 17, 59–60
See application file for complete search history.

(56) References Cited

U.S. PATENT DOCUMENTS

| 6,055,169 | A | 4/2000 | Bowman et al. |
| 6,297,616 | B1 | 10/2001 | Kubo et al. |
| 6,370,047 | B1 * | 4/2002 | Mallory ......................... 363/65 |
| 6,388,898 | B1 | 5/2002 | Fan et al. |
| 6,963,497 | B1 | 11/2005 | Herbert |
| 7,239,530 | B1 | 7/2007 | Djekic et al. |
| 2007/0139975 | A1 | 6/2007 | Yamauchi et al. |

FOREIGN PATENT DOCUMENTS

| DE | 101 22 461 A1 | 11/2002 |
| JP | 2004-7907 A | 1/2004 |
| SU | 1599958 A1 | 10/1990 |

* cited by examiner

*Primary Examiner* — Harry Behm
*Assistant Examiner* — Matthew Grubb
(74) *Attorney, Agent, or Firm* — Nath, Goldberg & Meyer; Jerald L. Meyer; Stanley N. Protigal

(57) ABSTRACT

A switch mode pulse width modulated DC-DC power converter having at least one first electronic circuit on an input side and a second electronic circuit on an output side. The first electronic circuit has terminals connecting to a source or load and at least one storage inductor, coupled in series with at least one power transformer winding. For each transformer, an arrangement of switches is adapted to switch the current through the first winding between first and second, ON- and OFF-states. At least one energy storage inductor is charged when all switches of the switching arrangements are conducting and the current through the first winding is in an OFF-state. The second electronic circuit has connecting terminals and a single arrangement of switches to switch the current through the second transformer winding, between the first and second ON- and OFF-states.

17 Claims, 11 Drawing Sheets

US 8,743,575 B2

Figure 1:
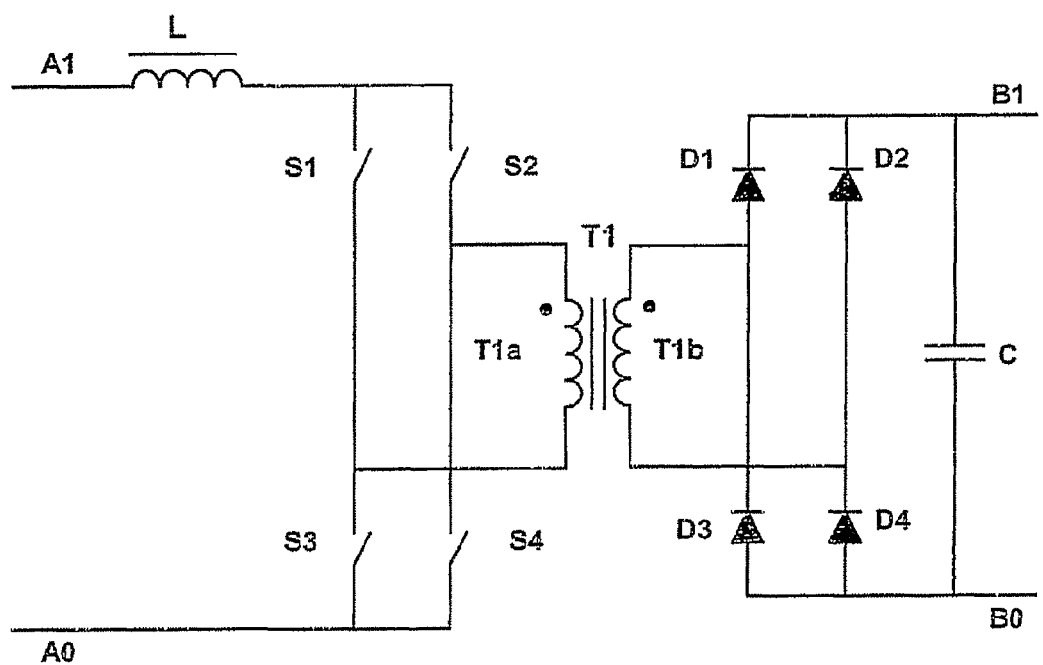

SWITCH MODE PULSE WIDTH MODULATED DC-DC CONVERTER WITH MULTIPLE POWER TRANSFORMERS

This is a National Phase Application filed under 35 USC 371 of International Application No. PCT/DK2008/000274, filed on Jul. 18, 2008, an application claiming the benefit under 35 USC 119(e) of U.S. Provisional Application No. 60/935,070, filed on Jul. 25, 2007, and claiming foreign priority benefits under 35 USC 119 of European Application No. 07388057.7, filed on Jul. 25, 2007, the content of each of which is hereby incorporated herein by reference in its entirety.

The invention relates to a switch mode pulse width modulated dc-dc converter with multiple power transformers.

Switch mode converters are widely used for converting a given input electrical power to a desired output electrical power. The input power is provided from a source to the converter through input terminals on an input side, converted by the converter into the desired output power and then output through output terminals on an output side provided to a load. The converter comprises switching arrangements for modulating the input electrical power in time and for rectifying converted electrical power before it is provided to the output terminals. The switches employed in such switching arrangements are typically provided as solid state switches, such as MOS-FET transistors employed in the modulating input switching arrangements, or diodes employed in the rectifying output switching arrangements.

The switches are activated by means of a control circuit controlling the time, frequency and/or duty cycle of the switches in the switching arrangements to assume an ON-state (switch closed) or an OFF-state (switch open). For example, in the case of MOSFET switches, the control circuit is adapted to provide a gate voltage to switch the source-drain conduction channel ON (conducting) or OFF (non-conducting) in a timed manner. A rectifying diode may also be implemented by a three-terminal device, such as a MOSFET, by operating the control circuit driving the three-terminal device in a synchronous rectification mode.

The dc-dc converter may be a boost-type converter converting an input voltage to a higher output voltage. For a given amount of electrical power transferred from the input to the output this means in particular that the input side needs to be adapted to handle large currents.

The dc-dc converter may be a buck-type converter converting an input voltage to a lower output voltage. For a given amount of electrical power transferred from the input to the output this means in particular that the output side needs to be adapted to handle large currents.

The converter may be configured as a bi-directional converter adapted to be operated in both directions, i.e. where terminals interchangeably can be operated as input or output terminals.

The converter is an isolated converter, where input and output are galvanically isolated from each other. A galvanic isolation is achieved by employing power transformers for transferring the electrical power from the input side to the output side.

An example of a high power application of dc-dc converters is the conversion of electrical power provided by fuel-cells in the form of high current at low voltages into a high voltage output. Due to the large currents involved in such a conversion, the components of the converter circuit are subjected to considerable current and voltage "stress". In a converter of the known type, components with large physical dimensions may be required to handle the large currents, with increased inductive losses as a consequence. In addition to the reduction in conversion efficiency, excessive heat dissipation may lead to a need for additional cooling and may severely limit the power rating of a converter.

Furthermore, the leakage inductance in converter circuits, in particular that associated with the switching components and associated connecting leads, tends to increase with the power converted. In particular, the circuit handling the lower voltage, and therefore the higher current, is affected by the leakage.

A way to overcome this problem is by operating a number of converters in parallel. Alternatively, the circuit handling the high currents may be split into a number of stages operating in parallel and the terminals of the circuit handling high voltages may be connected in series.

U.S. Pat. No. 6,297,616 discloses a charge and discharge apparatus for electric power storage means. The apparatus comprises an AC power source and a transforming apparatus with a first side and a second side. One of the two sides comprises a number of parallel full bridges converters, which are driven with a constant 50 percent duty cycle. The apparatus further comprises a number of storage inductors, which are charged by leading current through two primary switches coupled in series and on through the primary windings and the secondary windings of the transforming apparatus and finally through two secondary switches.

JP2004007907 discloses a switching power unit, in which a series circuit composed of an inductor and a boosting switch is provided for the output of a full-wave rectifying circuit. Two sets of insulated converters are provided in parallel to the boosting switch. Each of the insulated converters comprises on the primary side a current changeover switch, a primary winding of the converter, a reducing switch, and a flywheel diode. Each of the two converters are operated alternately (at half of the inductor switching frequency) taking the full inductor current at every second inductor discharge interval. On the secondary side, the insulated converters comprise a rectifying element and a capacitor.

A major disadvantage of the above approaches is the need for additional switching, rectifying and/or control units. Furthermore, considerable loss may be introduced due to differences between nominally identical components in the parallel stages. The differences between nominally identical components arise mostly from fabrication tolerances. These differences may be reduced to a certain degree by selecting higher quality components complying with smaller fabrication tolerances. However, this is a costly approach; in particular as these circuits themselves require a larger number of components.

The object of the present invention is to provide a converter reducing power conversion losses and overcoming the above mentioned problems by means of a simple converter arrangement.

This is achieved by a pulse width modulated switch mode DC-DC boost converter according to the invention comprising at least one first electronic circuit on a input side and a second electronic circuit on a output side, the input side and the output side being coupled via at least two power transformers, each power transformer comprising a first winding arranged in a input side converter stage on the input side and a second winding arranged in a output side converter stage on the output side, each of the windings having a first end and a second end. The first electronic circuit comprises terminals for connecting a source or a load, at least one energy storage inductor coupled in series with at least one of the first windings of the power transformers, and for each power transformer, an arrangement of switches being adapted to switch the current through the first winding between a first ON-state, a first OFF-state, a second ON-state with a polarity opposite to the first ON-state, and a second OFF-state, wherein the at least one energy storage inductor is arranged so as to be charged, when all switches of side 3a the switching arrangements are conducting. The second electronic circuit comprises terminals for connecting a load or a source, and a single arrangement of switches being adapted to switch the current through the second windings of the power transformers between a first ON-state, a first OFF-state, a second ON-state with a polarity opposite to the first ON-state, and a second OFF-state, and/or being adapted to provide rectified current to the terminals. The second windings of all power transformers are connected in series and coupled via the single arrangement of switches of the second circuit to the terminals of the output side.

The current flowing in the at least one first circuit on the input side is higher than the corresponding current in the second circuit on the output side. The current on the input side is therefore referred to as high current, while the current flowing on the output side is referred to as low current.

The arrangement of the first winding together with the corresponding switching arrangement on the input side is referred to as a input side converter stage. The arrangement of the second windings together with the single switching arrangement of the output side is referred to as output side converter stage.

The input side converter stages are connected to terminals for connecting a source or a load. In practice, the different input side converter stages are often connected to the same DC-source (or load) so as to operate in parallel.

Alternatively, different input side converter stages may be connected to different DC-sources (or loads), thereby operating independently as different first circuits. Furthermore, in an arrangement of more than one first circuit, it can be conceived that each of the first circuits comprises a number of input side converter stages connected in parallel.

The terminals in the first circuit may be connected to a source providing a high current (low voltage) source output. The high current to be handled on the input side is split up and distributed to separate input stages. In each input stage, the current is provided to the first winding through its corresponding switching arrangement adapted to control the current state in the first winding. By distributing the high current over at least two input side converter stages, the power handled by each of the input side converter stages is divided correspondingly, thereby reducing current stress on the individual switching components and losses due to parasitic impedances, such as leakage inductance and/or wiring resistance. The current is via the power transformers transferred to the output side output stage and via the terminals of the output side provided as rectified output current to a load. Since all second windings are coupled directly in series, the current through the second windings is clamped, thereby contributing to an equal current distribution between the input side input stages. Furthermore, only a single switching arrangement, here a common rectifier circuit, is required, thereby reducing circuit complexity and cost.

The at least one energy storage inductor is charged from the terminals of the input side, when all switches of the switching arrangements are conducting, and where no current is conducting through the second windings on the output side and/or where the arrangement of switches on the output side is blocking the current.

Charging of the energy storage inductor is stopped by rendering one or more of the switches in the switching arrangement non-conducting so as to disconnect at least one end of the energy storage inductor from the source. At the same time one or more switches in the switching arrangement are kept conducting so as to maintain a current path for transferring the energy stored in the at least one energy storage inductor to the at least one first winding.

A typical switching cycle of a converter according to the invention operated with input from the input side comprises four consecutive parts as associated with the state of the current through the at least one first winding:

during the first OFF-state, the energy storage inductor is charged, during the first ON-state, the energy is transferred from the energy storage inductor to the at least one first winding by running a current in a first direction through the first winding, during the second OFF-state, the energy storage inductor is re-charged, and during the second ON-state the energy is transferred from the energy storage inductor to the at least one first winding by running a current in a second direction opposite to the first direction through the first winding.

The current pulses thus induced in the first windings of the power transformers are coupled to the corresponding second windings. The second windings are coupled directly in series, and therefore the current induced in the second windings is limited by the power transformer providing the smallest induced current, thereby clamping the currents in the other power transformers to an essentially equal distribution. An equal distribution reduces the risk for uneven stress on the components in the different converter stages on the input side, reducing the need for dimensioning of components to a large safety margin and thereby reducing production cost. The current pulses in the second windings are rectified by the single switching arrangement of the second circuit and provided as low current rectified output via the terminals on the output side to a load.

A further advantage of the converter according to the invention is that the switching arrangements of different input side converter stages are typically operated in a synchronous manner in order to simultaneously provide essentially the same current state in all of the first windings of the input side converter stages. Therefore, a single control circuit is sufficient for driving all input side switching arrangements. This considerably simplifies the overhead circuitry for a converter according to the invention, thereby reducing production cost.

As mentioned, the at least one energy storage inductor is charged directly through the preferably four, primary switches. Thereby, the losses due to parasitic impedances corresponds to the impedance from one switch only. Thus, compared to U.S. Pat. No. 6,297,616, the present invention saves the losses from one primary switch, the primary and secondary windings of the transformation stage and two secondary switches.

Preferably, the pulse width modulated switch mode DC-DC boost converter is controlled via the arrangement of switches on the input side.

According to a first advantageous embodiment, the at least one energy storage inductor is coupled to or is part of a current-balancing electrical circuit. The current-balancing has been necessitated by the new converter topology in order to minimise losses from the converter. In practice, the current balancing according to the invention can be achieved in two ways, viz. by at least pair-wise magnetically coupling energy storing inductors on a common magnetic core so as to equalise their inductance, or by coupling the energy storage inductor in series with at least one current balancing transformer on the input side. These embodiments are described later.

The current balancing may also be utilised for buck converters. Therefore, according to another aspect, the invention provides: a pulse width modulated switch mode DC-DC buck converter comprising at least one first electronic circuit on a input side and a second electronic circuit on a output side, the input side and the output side being coupled via at least two power transformers, each power transformer comprising a first winding arranged in a input side converter stage on the input side and a second winding arranged in a output side converter stage on the output side, each of the windings having a first end and a second end. The first electronic circuit comprises terminals for connecting a load or a source, and a single arrangement of switches being adapted to switch the current through the first winding between a first ON-state, a first OFF-state, a second ON-state with a polarity opposite to the first ON-state, and a second OFF-state. The first windings of all power transformers are connected in series and coupled via the single arrangement of switches of the first circuit to the terminals of the input side. The second electronic circuit comprises terminals for connecting a source or a load, at least one energy storage inductor coupled in series with at least one of the second windings of the power transformers, and for each power transformer, an arrangement of switches being adapted to rectify current.

The at least one energy storage inductor is charged, when the current through the first winding is in the first ON-state and/or the second ON-state. Typically, this occurs when two of the switches on the input side are conducting. In one embodiment a first energy storage inductor is charged when two of the switches are conducting, and a second energy storage inductor is charged when two other switches are conducting.

According to a first advantageous embodiment of the buck converter, the at least one energy storage inductor is coupled to or is part of a current-balancing electrical circuit. In practice, the current balancing according to the invention can be achieved in two ways, viz. by at least pair-wise magnetically coupling energy storing inductors on a common magnetic core so as to equalise their inductance, or by coupling the energy storage inductor in series with at least one current balancing transformer on the output side. Thus, the methods described for current balancing the boost converter and the following described embodiments may also be used for the buck converter.

According to another advantageous embodiment, the arrangement of switches is adapted to switch the current through the first windings comprises two parallel coupled stages, each of the parallel coupled connections comprising a first switch serial connected to a second switch, and wherein the first end of the first winding is coupled to the serial connection of one of the two parallel coupled stages, and wherein the second end of the first winding is coupled to the serial connection of the other of the two parallel coupled stages.

According to one aspect of the invention, the converter is adapted for operation as a boost converter, wherein the input side converter stages are provided as modulating input stages and the output side converter stage is provided as a rectifying output stage.

In practice, the modulating input stages are—apart from fabrication tolerances—nominally identical, and the switching arrangements of the modulating input stages are typically equipped with solid state switches, such as MOSFETs having a source-terminal and a drain terminal connected to the source-terminal via a source-drain channel, as well as a gate terminal for switching the conductivity of the source-drain channel. The switching action is timed and driven by a control unit. In order to avoid current and voltage stress over individual components, the switching arrangements are driven in a synchronous manner. Therefore, a single control unit is often sufficient for controlling all solid state switches of the modulating input switches.

According to one embodiment, the output stage is provided with a single rectifying arrangement of switches in common for all power transformers. The switches may be diodes or three terminal solid state switches driven in a synchronous manner so as to render the switches conducting, when current flows in one direction, and non-conducting, when current flows in the opposite direction, whereby the solid state switches effectively act as diodes.

In one embodiment of the invention, all modulating input stages are connected in parallel to the common input terminals, and the arrangement of switches in each of the modulating input stages is a full-bridge boost arrangement of switches.

In another embodiment according to the invention, all modulating input stages are connected in parallel to the common input terminals, and the arrangement of switches of the modulating input stages is a push-pull boost arrangement of switches.

In yet another embodiment according to the invention, all modulating input stages are connected in parallel to the common input terminals, and the arrangement of switches of the modulating input stages is a two-inductor boost arrangement of switches.

In a further development of the above mentioned embodiments, the single arrangement of switches in the output stage is provided by diodes in a rectifying full-bridge arrangement. Other configurations of the rectifying output stage, such as split secondary rectifier or voltage doubler rectifier configurations, may be conceived.

In one advantageous embodiment according to the invention, the input side converter stages are connected in parallel to a common pair of terminals. This embodiment is particularly advantageous, when the DC-power from one high current (low-voltage) source, such as a fuel cell arrangement, is to be converted in order to drive a load requiring voltages exceeding the voltage provided by the source. Alternatively, one high power load requiring a large current may be supplied from a low current (high voltage) source through a converter according to this embodiment of the invention.

In a further embodiment according to the invention, each of the input side converter stages comprises at least one energy storage inductor connected in series with the first winding of said input side converter stage. By arranging an energy storage inductor in each converter stage, it is achieved that each energy storage inductor only handles a fraction of the current. This is particularly advantageous for high power applications, where e.g. heat dissipation in a single energy storage inductor otherwise might limit scaling of the converter to the required specification.

Further, according to the invention, at least two energy storage inductors, each being arranged in a different input side converter stage, are at least pair-wise magnetically coupled via a common magnetic core so as to equalise their inductance. In practice, the magnetic coupling is typically provided by winding the at least two energy storage inductors onto a common magnetic core. Consequently, the at least two energy storage inductors may be perceived as a single energy storage inductor having at least two windings on a common core.

Advantageously, the inductor windings are wound together to form interleaved coils on the same magnetic piece. The magnetic coupling ensures a substantially identical inductance for the coupled inductors and that the currents are balanced between the two coupled stages. The current distribution can effectively be controlled by the power transformers. The well-balanced current distribution between the coupled stages thus achieved minimises the loss, since the difference in currents otherwise would have to be dissipated in a protection circuit on the input side in order to fulfil the condition of current limitation to the smallest of the first winding currents as imposed by the direct serial coupling of the second windings. Furthermore, current and voltage stresses in the converter stage components, such as the solid state switches in the switching arrangements are minimised, thus allowing for a more optimised and consequently more cost efficient dimensioning of the components.

In a further embodiment according to the invention, the at least one energy storage inductor is provided as a common energy storage inductor for the power transformers. This embodiment eliminates artefacts in the current distribution between input side converter stages due to differences between different energy storage inductors, as all input side converter stages are supplied from the common energy storage inductor.

In a further aspect of the invention, the converter comprises at least one current balancing transformer on the input side. The current balancing transformer comprises at least one primary winding provided in a primary branch in series with the arrangement of switches of a first converter stage on the input side, and at least one secondary winding provided in a secondary branch in series with the arrangement of switches of a further input side converter stage. The primary windings and the secondary windings are arranged with opposite polarity to magnetically couple the primary branch and the secondary branch so as to induce opposite currents in the coupled branches, thereby pair-wise balancing the current distribution between the coupled branches at a predetermined current balancing ratio.

The at least one current balancing transformer provides a coupling between at least two input side converter stages, whereby energy can be transferred between the at least two converter stages in order to balance the current in the corresponding first windings. The current balancing transformer does not have to handle the full power provided to the respective converter stages, but only balance the deviations from the pre-determined balancing ratio and, consequently, the current balancing transformer is in practice dimensioned to the expected spread of deviations from the nominal current flowing in each of the input side converter stages. The balancing ratio is essentially determined by the transformer ratio, which is adapted to the ratio between the number of power transformers to be supplied through the primary branch to the number of power transformers to be supplied through the secondary branch. Typically, the primary branch and the secondary branch will be adapted to distribute current equally to an identical number of power transformers and the current balancing ratio is chosen to be 1:1.

In a further development of the above mentioned embodiment, a converter comprises an even number $N=2n$ of the power transformers, where n is an integer number greater than one, and a cascading arrangement of a number $M=(2n-1)$ of the current balancing transformers arranged to successively balance the current through the first windings of the N power transformers in cascading pairs of coupled branches, wherein each of the current balancing transformers provides a current balancing ratio of 1:1.

This tree-like arrangement of current balancing transformers is mostly applicable for input side converter stages operated in parallel and being supplied via a common pair of terminals from the same source. In particular, a number of $2^k$ power transformers is well suited for such an arrangement, where k is the number of times the branches are divided before the power transformer stage.

In a first step of the cascade, a first branch connected to one terminal on the input side is bifurcated into a first primary branch and a first secondary branch. The first primary branch is coupled to the first secondary branch via a first current balancing transformer in order to provide for an equal distribution of currents between the primary and secondary branch. In each further step of the cascade, each of the first primary and secondary branches of that step are bifurcated into primary and secondary branches of the next step until the number of branches equals the number of input side converter stages each comprising one power transformer. The branches of the final step of the cascade are then connected so as to supply one input side converter stage each. In each step of the cascade, primary and secondary branches are provided with a current balancing transformer having a balancing ratio of 1:1 in order to ensure an equal distribution of current into each of the branches, thereby ensuring an equal distribution of the current to all input side converter stages.

In another development of the above mentioned embodiment, the converter comprises an uneven number $P=(2n+1)$ of the power transformers, where n is an integer number greater than or equal to one, and a cascading arrangement of a number $Q=2n$ of the current balancing transformers arranged to successively balance the current through the first windings of the N power transformers in cascading pairs of coupled branches, wherein at least one of the current balancing transformers provides a current balancing ratio of 2:1. This arrangement of current balancing transformers ensures an even distribution of current over an uneven number (greater than one) of input side converter stages. This embodiment according to the invention is particularly relevant for converters where the number of power transformers to be supplied from one branch can not be expressed as a power of two, such as an uneven number of power transformers. For example, an equal distribution of current to three input side converter stages, each comprising one power transformer, can be achieved in a first step of the cascade by providing twice the current to the first primary branch than to the first secondary branch and subsequently only bifurcating the first primary branch into a further primary and a further secondary branch supplied at a current distribution ratio of 1:1. The current distribution ratio in the first step is balanced by a current distribution transformer with a current balancing ratio of 2:1, while the current distribution between the further primary branch and the further secondary branch is balanced by a current balancing transformer with a current distribution ratio of 1:1. The first secondary branch, the further primary branch and the further secondary branch are then connected to supply one input side converter stage each.

According to another aspect of the invention the converter is adapted for operation as a bidirectional converter, wherein all arrangements of switches are provided by switches in a full-bridge configuration. In order to operate the converter in both directions, the switches in the switching arrangements have to be controllable switches, i.e. three terminal devices. Control circuits have to be provided for both sides of the converter, said control circuits being adapted to drive the switches for input modulation when the corresponding converter stage is operated as input, and to drive the switches for rectification when the corresponding converter stage is operated as output.

In a practical implementation of the converter circuit according to the invention, the parallel stages of the first circuit may be connected through a clamping and protection circuit. Furthermore, a low-pass filter is provided, in practice often as a capacitor connected across the input terminals and/or output terminals, in order to remove transients and ripples from the dc-current to be provided at the respective terminals. For the sake of clarity, such clamping, protection and filtering circuitries are not described in detail.

Figure 2:
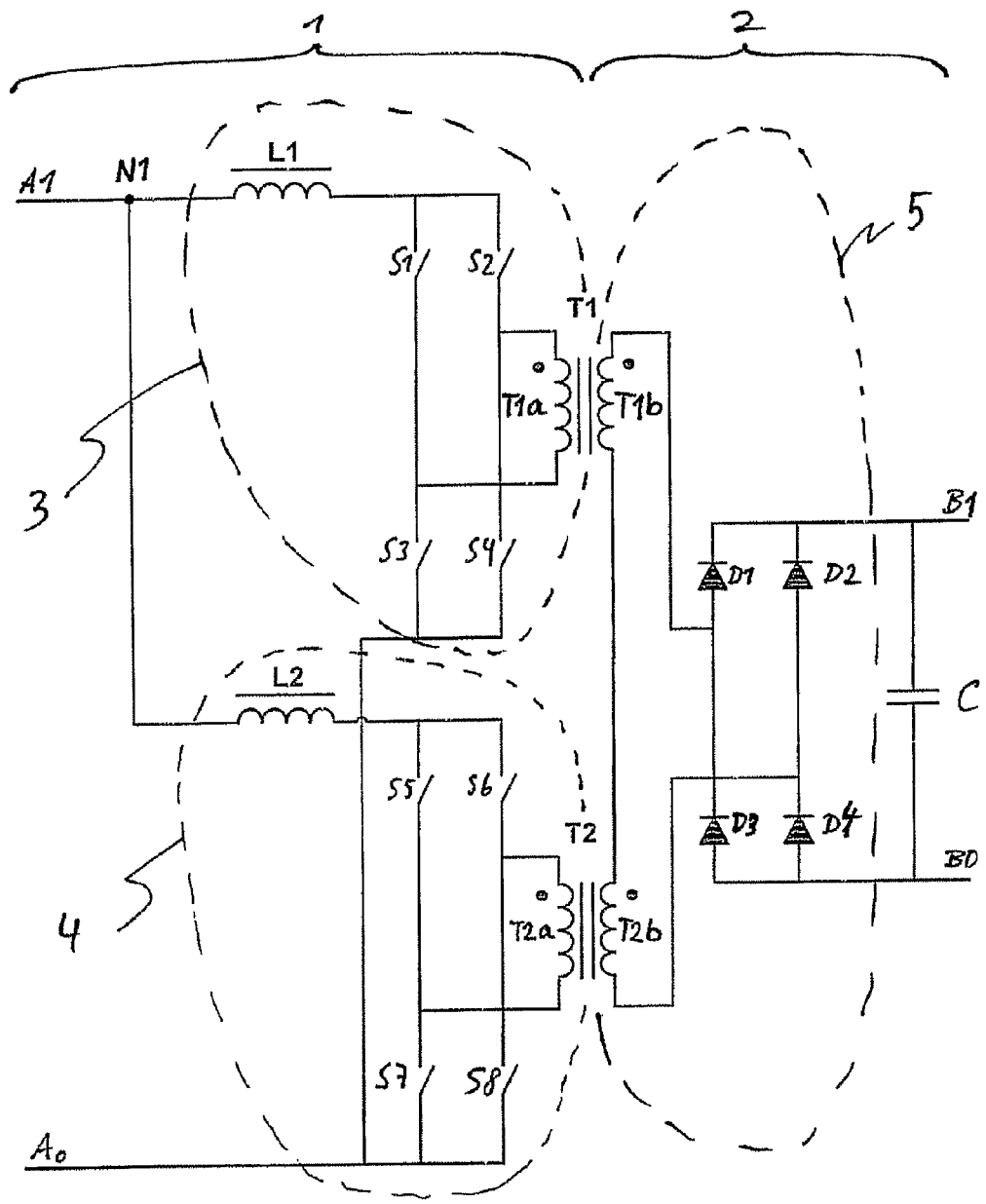
Figure 3:
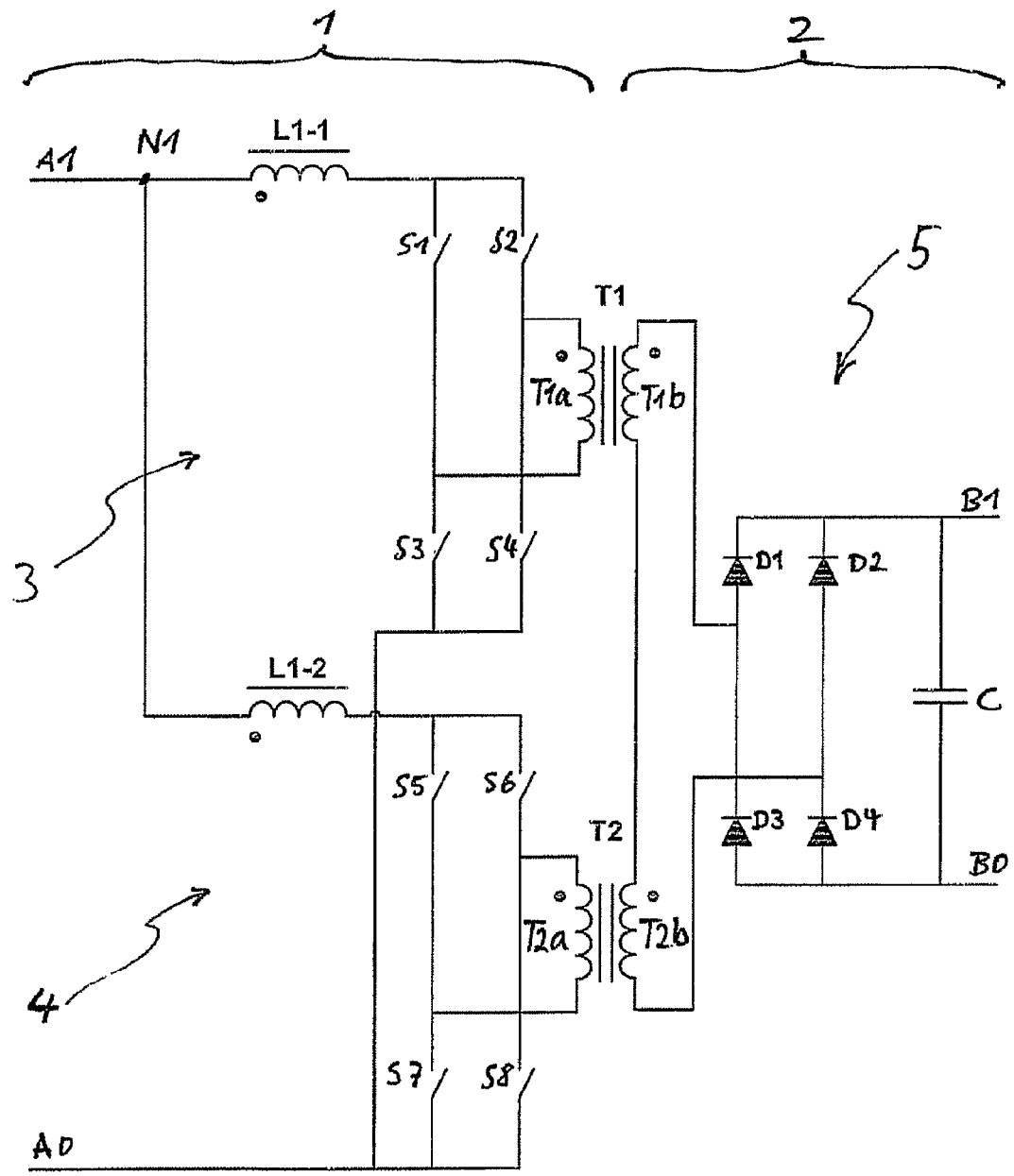
Figure 4:
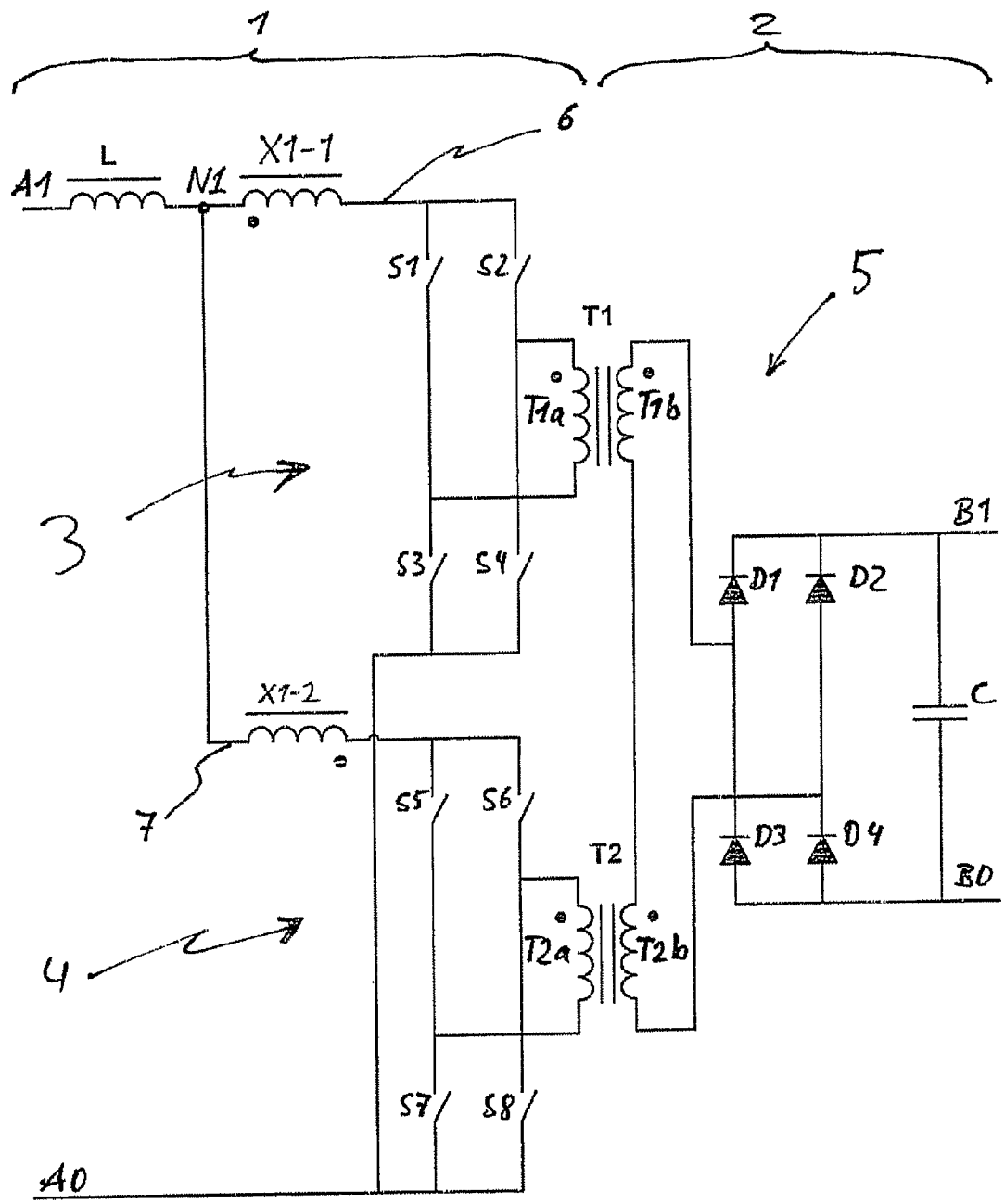
Figure 5:
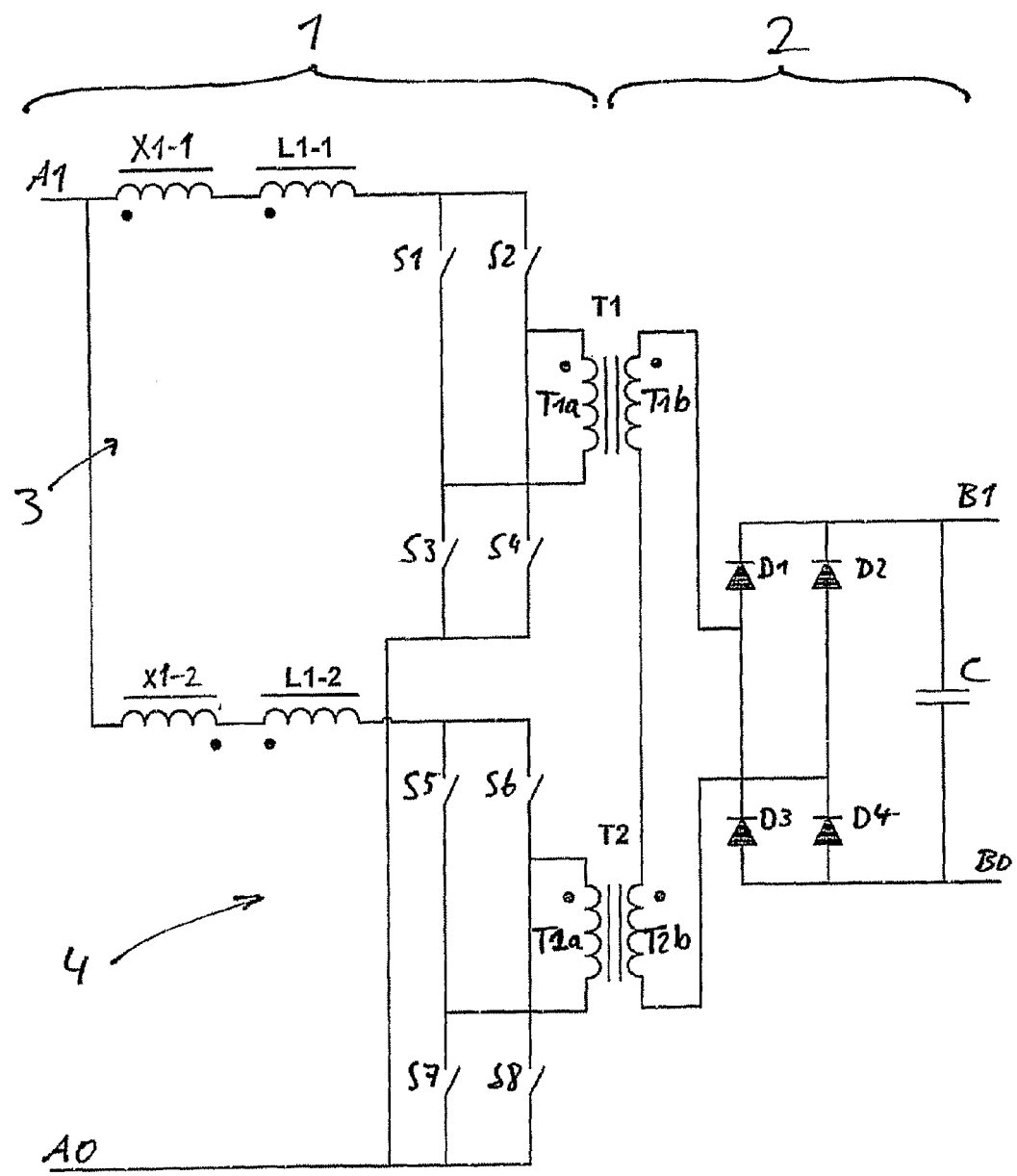
Figure 6:
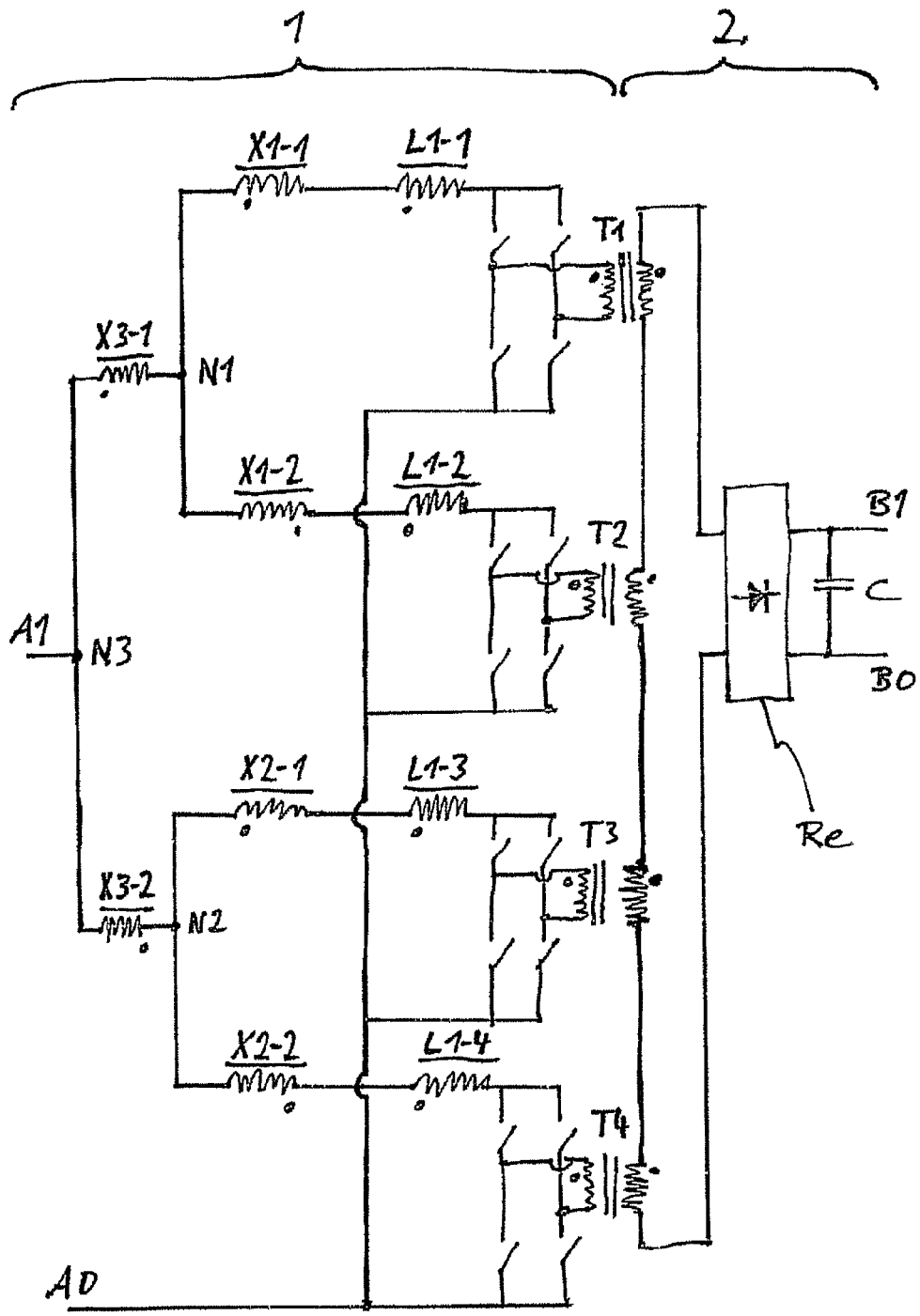
Figure 7:
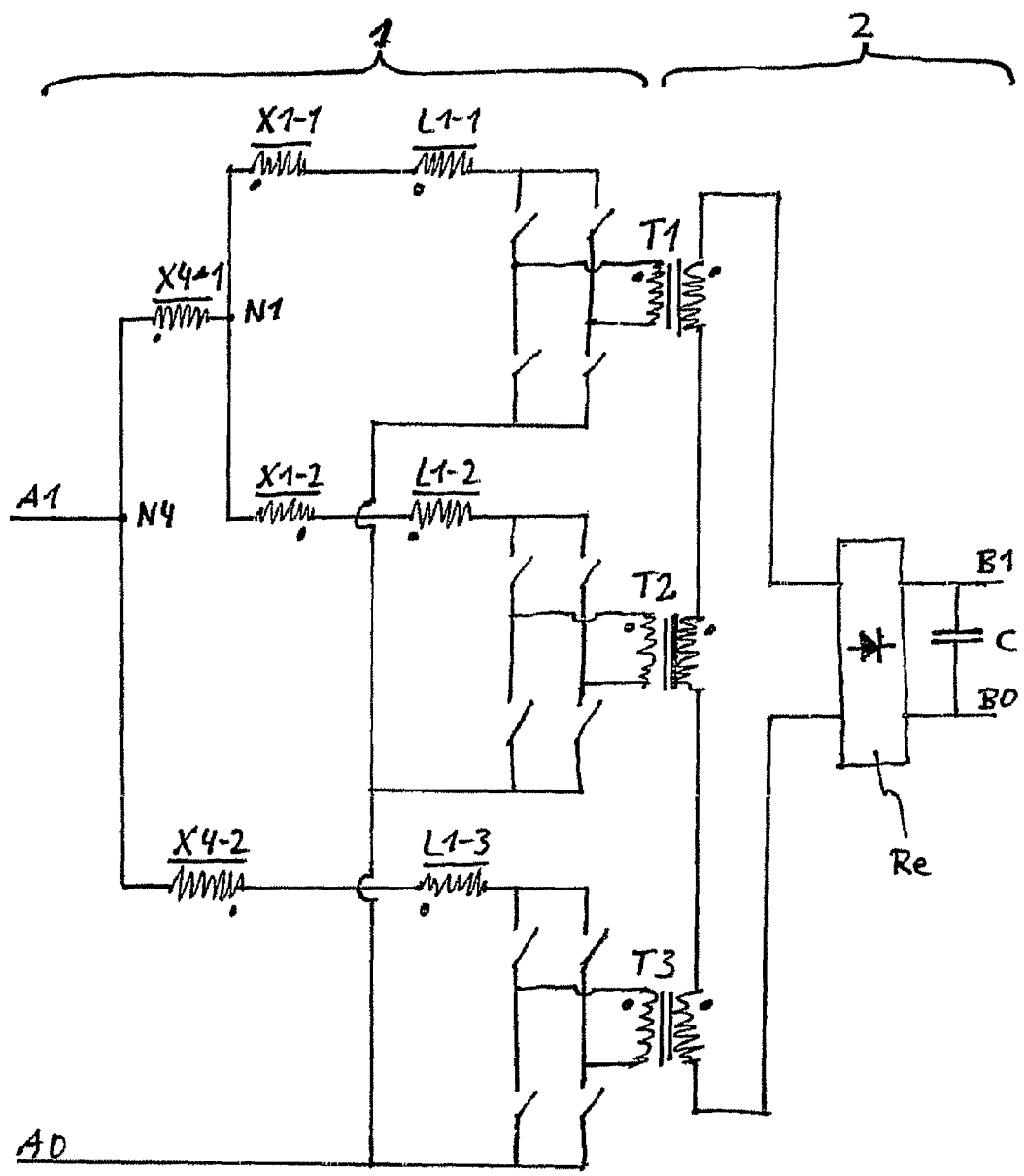
Figure 8:
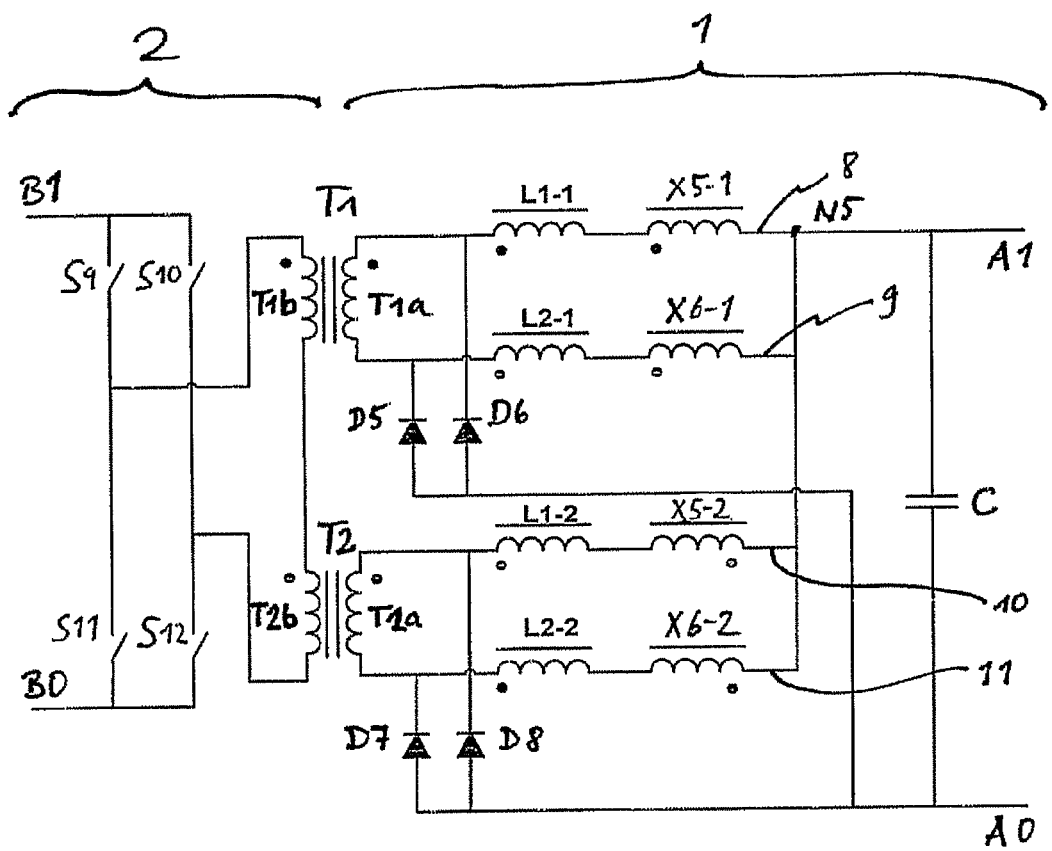
Figure 9:
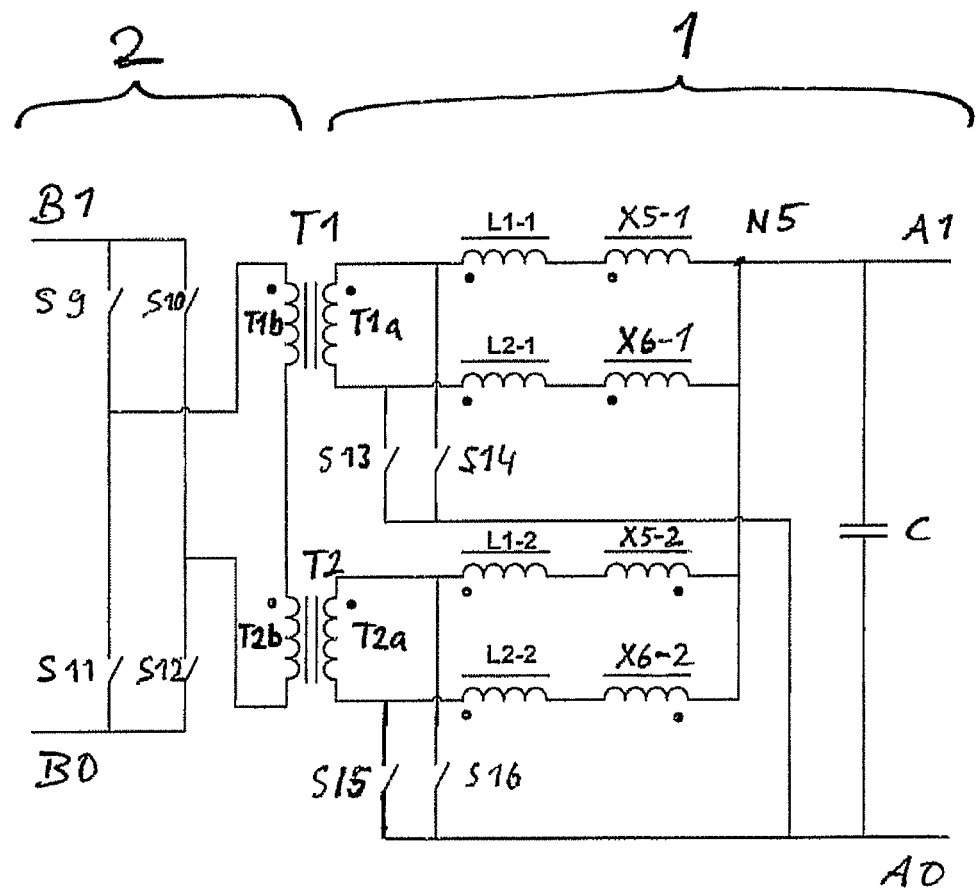
Figure 10:
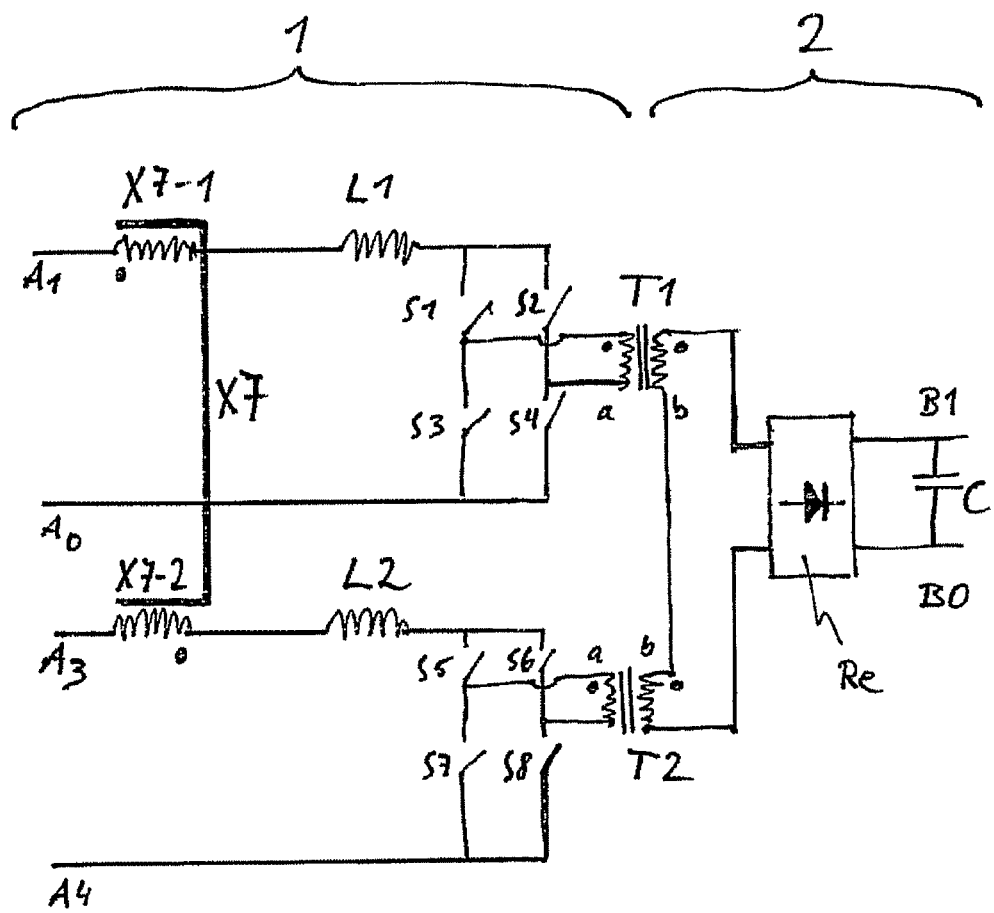
Figure 11:
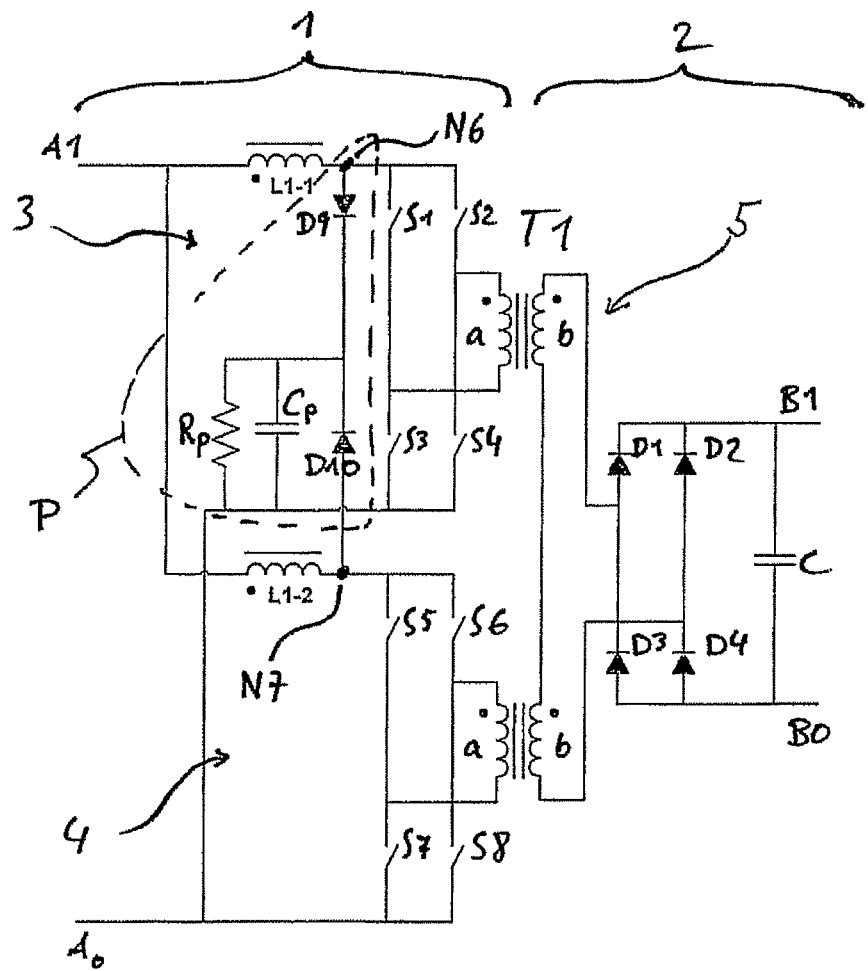

The invention is now explained by exemplifying embodiments with reference to the drawings. The drawings show in:

FIG. 1 a prior art isolated boost converter,

FIG. 2 an isolated boost converter with two parallel input stages, each comprising an energy storage inductor, FIG. 3 an isolated boost converter with two parallel input stages and magnetically coupled energy storage inductors, FIG. 4 an isolated boost converter with two parallel input stages, one common energy storage inductor and a current balancing transformer, FIG. 5 an isolated boost converter with two parallel input stages, magnetically coupled energy storage inductors and a current balancing transformer, FIG. 6 an isolated boost converter with four parallel input stages and a cascading arrangement of three current balancing transformers, FIG. 7 an isolated boost converter with three parallel input stages and a cascading arrangement of two current balancing transformers, FIG. 8 an isolated buck converter with two parallel output stages with current doubler rectifier arrangements, magnetically coupled energy storage inductors and current balancing transformers, FIG. 9 an isolated bidirectional converter with two parallel first side converter stages, each comprising a current doubler rectifier arrangement, magnetically coupled energy storage inductors and current balancing transformers, FIG. 10 an isolated boost converter with independent input side converter stages coupled through a current balancing transformer, and FIG. 11 the isolated boost converter of FIG. 3 with a protection circuit.

FIG. 1 shows a prior art isolated boost converter with one input stage and one output stage coupled through a power transformer T1.

The input stage is provided with an energy storage inductor L, and a full-bridge arrangement of modulating switches S1, S2, S3, S4 controlling the current through a first winding T1$a$ of the power transformer T1.

The output stage comprises a full-bridge rectifier arrangement of diodes D1, D2, D3, D4 for rectifying the current pulses received from the second winding T1$b$ of the power transformer T1. Output power can be provided to a load (not shown) through a pair of output terminals B0, B1. The output current is controlled by modulating the pulse width of the current pulses through the first winding by controlling the switches S1, S2, S3, S4 accordingly by use of a control unit (not shown). When all switches S1, S2, S3, S4 are closed, the energy storage inductor L is charged while the first end and the second end of the first winding T1$a$ are short circuited. The current in the first winding T1$a$ is in first OFF-state. Opening the pair of switches S1, S4 simultaneously puts the current through the first winding T1$a$ in a first ON-state for driving a first current pulse through the first winding T1$a$, thereby transferring energy from the boost inductor to the power transformer until the switches S1, S4 are closed again and the energy storage inductor L is recharged. Subsequently, the remaining pair of switches S2, S3 is activated and a second current pulse running opposite to the first is generated. The activation scheme of the switches S1, S2, S3, S4 is intended to be operated to always provide a current path for discharge of the energy storage inductor in order to avoid an excessive buildup of harmful voltage stress across any of the switches S1, S2, S3, S4. Commonly, a protection circuit (snubber, not shown here) is provided in order to absorb excessive currents/voltages.

Furthermore, a capacitor C is connected across the output terminals B0, B1 in order to remove ripple and transients from the output power. The function of the capacitor C is the same throughout all embodiments, and therefore the description of the capacitor C is omitted in the following.

FIG. 2 shows a first embodiment of a dc-dc converter according to the invention. The isolated boost converter shown in FIG. 2 has on a input side 1 two input side converter stages 3, 4 connected in parallel and coupled through two power transformers T1, T2 to a output side converter stage 5 on a output side 2.

The input side 1 converter stages 3, 4 are configured as input stages, wherein each converter stage comprises an energy storage inductor L1, L2, and a full-bridge arrangement of modulating switches {S1, S2, S3, S4}, {S5, S6, S7, S8} controlling the current through the first windings T1$a$, T2$a$ of the power transformers T1, T2.

The output side 2 converter stage 5 comprises a single full-bridge rectifier arrangement of diodes {D1, D2, D3, D4} for rectifying the current pulses received from the second windings T1$b$, T2$b$ of the two power transformers T1, T2. The second windings T1$b$ and T2$b$ are directly connected in series, the outermost ends being connected to the rectifier {D1, D2, D3, D4}.

In operation, high current is provided to the input side through terminals A0, A1. The current is split at a node N1 according to the impedances of the input side converter stages, and fed to the first windings T1$a$, T2$a$ as modulated by the arrangements of switches {S1, S2, S3, S4}, {S5, S6, S7, S8}, respectively. The generated current pulses are transferred to the second windings T1$b$, T2$b$. Because of the direct serial connection of the second windings T1$b$, T2$b$, the therein induced current is limited to the smallest of the currents transferred in parallel from the first windings T1$a$, T2$a$. The excess current that can not be transferred from the input side 1 to the output side 2 is typically absorbed by a protection circuit (snubber) P on the input side. The absorbed energy may either be dissipated in, or in some cases recovered for a later transfer from the protection circuit P. The current pulses induced in the series of second windings T1$b$, T2$b$ are rectified in a common rectifier unit formed by a single arrangement of switches, here shown as a full-bridge arrangement of diodes {D1, D2, D3, D4}. The rectified output may be passed through a low-pass filter C and via output terminals B0, B1 provided to a load.

FIG. 3 shows a modified version of the isolated boost converter shown in FIG. 2, which is modified by providing a coupling between the two parallel input stages 3, 4 in order to equalise the current distribution to said input stages 3, 4. The coupling is provided by magnetically coupling the energy storage inductor L1-1 provided in a first input stage 3 and the energy storage inductor L1-2 provided in a second input stage 4, for example by winding the two inductors onto a common magnetic core. The magnetic coupling ensures that the coupled energy storage inductors assume essentially the same inductance, and current balancing between the two inductors is controlled during the energy transfer state, i.e. the ON-state, by the serial connection of the second windings of the power transformers.

FIG. 4 shows a further embodiment of an isolated dc-dc converter according to the invention. The energy storage inductor is provided as a common inductor L that is placed before the bifurcation in node N1. This embodiment is particularly applicable where the size and/or power performance of the single energy storage inductor L are not limiting. The advantage of this embodiment is that no spread in the current distribution occurs. This spread typically arises due to differences in inductance between separate energy storage inductors L1, L2 placed within the input stages of for instance the embodiment shown in FIG. 2.

In the embodiment shown in FIG. 4, the two parallel input stages 3, 4 are coupled by a current balancing transformer X1. The current balancing transformer X1 comprises a primary winding X1-1 arranged in a primary branch 6 in the first input stage 3, and a secondary winding X1-2 in a secondary branch 7 in the second input stage 4.

If the currents in the two input stages 3, 4 differ from each other, the transformer X1 balances the currents in the two input stages by "pulling" a voltage from one of the input stages to the other input stage. The current balancing transformer X1 does only have to handle the smaller voltages required to balance the currents rather than having to handle the full power in each input stage 3, 4. This has a considerable practical advantage, because the current balancing transformer X1 only requires a fraction of the power rating as compared to the full power converted.

FIG. 5 shows a combination of the embodiments of an isolated boost converter shown in FIGS. 3 and 4. Each of the input stages 3, 4 is provided with an energy storage inductor L1-1, L1-2. The energy storage inductors L1-1, L1-2 are magnetically coupled in order to equalise their inductance. In addition, a current balancing transformer X1 is provided to couple the two input stages 3, 4 so as to compensate for differences in the currents flowing in the two input stages 3, 4. An embodiment where the energy storage inductors L1-1, L1-2 are not magnetically coupled is also anticipated by the invention.

FIG. 6 shows an isolated boost converter comprising four power transformers T1, T2, T3, and T4 respectively, connected to one of four parallel input stages on the input side 1, and to a rectifying output stage Re on the output side 2.

Each of the four input stages comprises an energy storage inductor L1-1, L1-2, L1-3, L1-4, and a full-bridge arrangement of modulating switches for controlling the current through the first winding of the corresponding power transformer T1, T2, T3, T4. In the configuration shown, all four energy storage inductors L1-1, L1-2, L1-3, L1-4 are magnetically coupled so as to equalise their inductance.

Current is supplied to the input side 1 through a cascading arrangement of bifurcating nodes N3, N2, N1 splitting the input current provided through terminal A1 so as to provide equal current input to all four input stages. At each bifurcation N3, N2, N1, the current distribution is balanced by a current balancing transformer X3, X2, X1, each comprising a primary winding X3-1, X2-1, X1-1, and a secondary winding X3-2, X2-2, X1-2.

In order to achieve an equal current distribution, the impedances of all four input stages are designed to be essentially the same, and the current balancing ratio as given by the transformer ratio is 1:1 for all three current balancing transformers X3, X2, X1.

Embodiments where the energy storage inductors L1-1, L1-2, L1-3, L1-4 are not magnetically coupled are also anticipated by the invention.

FIG. 7 shows another embodiment of a dc-dc boost converter according to the invention. The embodiment shown in FIG. 7 comprises three power transformers T1, T2, T3 supplied from the input side 1 through a cascading arrangement of bifurcating nodes N4, N1 with current balancing transformers X4, X1, each comprising a primary winding X4-1, X1-1, and a secondary winding X4-2, X1-2. Node N1 provides current to two nominally identical input stages. Therefore, the current balancing transformer X1 balances the currents at a balancing ratio of 1:1. Node N4, however, provides current to three input stages, viz. two input stages being supplied through the primary winding X4-1, and one input stage being supplied through the secondary winding X4-2 of the current balancing transformer X4. Therefore, the current balancing ratio of the current balancing transformer X4 is 1:2, so as to provide twice as much current through the primary winding X4-1 as through the secondary winding X4-2. X4-2 therefore comprises twice as many windings as X4-1. Embodiments where the energy storage inductors L1-1, L1-2, L1-3 are not magnetically coupled are also anticipated by the invention.

FIG. 8 shows an alternative embodiment of a dc-dc converter utilising a current balancing transformer. The embodiment shown in FIG. 8 is an isolated buck-type converter comprising two power transformers T1, T2, where the output side 2 is operated as input stage, and the input side 1 comprises two parallel rectifying output stages.

On the input side, a single full-bridge-arrangement of switches {S9, S10, S11, S12} controls the current through all second windings T1b, T2b coupled in series with each other.

On the output side, each of the first windings T1a, T2a feeds a current-doubler rectifying circuit. Depending on the direction of the current in the first windings T1a, T2a the output is provided in parallel through energy storage inductors L1-1 and L1-2 connected to the input side of the first windings T1a, T2a, or through energy storage inductors L2-1, L2-2 connected to the output side of the first windings T1a, T2a.

Corresponding branches of the parallel output stages are coupled in order to ensure an equal distribution of currents between the output stages. The corresponding branches are those branches that are connected to simultaneously provide current to the output terminal A1 through node N5. That is, branch 8 and branch 10 correspond to each other, and branch 9 and branch 11 correspond to each other. The coupling is achieved by magnetic coupling of the energy storage inductors L1-1, L1-2 and L2-1, L2-2 in the corresponding branches of the parallel output stages and/or by means of current balancing transformers X5, X6 for balancing current between the primary winding X5-1 in the primary branch 8 and the secondary winding X5-2 in the secondary branch 10, and accordingly between branch 9 and branch 11 by balancing current between the primary winding X6-1 and the secondary winding X6-2 of the current balancing transformer X6, respectively.

When S9 and S12 are conducting, the current through the second windings T1b, T2b are in a first ON-state, and diodes D6 and D8 are OFF. Thus, energy storage inductors L1-1 and L1-2 are charged, while energy storage inductors L2-1 and L2-2 are discharged. When S10 and S11 are conducting, the current through the second windings T1b, T2b are in a second ON-state, and diodes D5 and D7 are OFF. Thus, energy storage inductors L2-1 and L2-2 are charged, while energy storage inductors L1-1 and L1-2 are discharged.

Embodiments where the energy storage inductors L1-1, L1-2 and/or the energy inductors L1-3, L1-4 are not magnetically coupled are also anticipated by the invention.

FIG. 9 shows a further embodiment of a dc-dc converter according to the invention. The embodiment shown in FIG. 9 is an isolated bidirectional converter comprising two power transformers T1, T2. The switching arrangements of both sides are provided with controllable switches {S9 ... S12}, {S13, S14}, {S15, S16}, such as three-terminal solid-state switches. Thus, the converter can be operated in both directions. On the side chosen as the input, the switching arrangement(s) are driven to modulate the input current. On the opposite side (chosen as the output), the switching arrangement(s) are driven to rectify the current pulses received from the power transformers T1, T2.

Embodiments where the energy storage inductors L1-1, L1-2 and/or the energy inductors L1-3, L1-4 are not magnetically coupled are also anticipated by the invention.

FIG. 10 shows an isolated boost-type converter according to the invention comprising two power transformers T1, T2. The input side 1 is operated as input, wherein the input side converter stages are operated independently. The two input stages on the input side are coupled to ensure an equal distribution of the current between the two input stages. In the embodiment shown in FIG. 10, the coupling is achieved via a current balancing transformer with a primary winding X7-1 arranged in one input stage and a secondary winding X7-2 in the other input stage. Alternatively or in addition thereto the energy storage inductors L1 and L2 may be coupled magnetically, e.g. by winding both inductors L1, L2 onto a common magnetic core so as to equalise their inductance.

Deviations from the nominal current distribution between the input side converter stages or a failure in the controlling unit driving the switches of a switching arrangement can lead to undesired stress on the components and consequently lead to a failure of those components. In order to avoid such stresses, the input circuit is typically equipped with a protection circuit P. Many implementations of protection circuits are possible. Some protection circuits absorb and dissipate excess energy. Other protection circuits may provide for an at least partial recovery of the absorbed energy. FIG. 11 shows an example for a dissipative protection circuit P in the isolated boost converter of FIG. 3. The protective circuit P may receive excess current from the first input stage 3 through a node N6 and a diode D9, and from the second input stage 4 through a node N7 and a diode D10. The excess energy is absorbed by a large capacitor Cp and eventually dissipated through a resistor Rp.

The invention has been described with reference to a preferred embodiment. However, the scope of the invention is not limited to the illustrated embodiment, and alterations and modifications can be carried out without deviating from said scope of the invention.

| | List of reference numerals |
|---|---|
| 1 | input side |
| 2 | output side |
| 3, 4 | input side converter stages |
| 5 | output side converter stage |
| 6, 8, 9 | primary branch |
| 7, 10, 11 | secondary branch |
| A0, A1, A2, A3 | input side terminal |
| B0, B1 | output side terminal |
| C | capacitor |
| D1, D2, ..., D10 | diode |
| L, L1, L2 | energy storage inductor |
| L1-1, L1-2, L1-3, L1-4 | magnetically coupled energy storage inductor |
| L2-1, L2-2 | magnetically coupled energy storage inductor |
| N1, N2, ..., N7 | node |
| Re | rectifier unit |
| S1, S2, ..., S16 | switch |
| T1, T2, T3, T4 | power transformer |
| T1a, T2a | first winding |
| T1b, T2b | second winding |
| X1, X2, ..., X7 | current balancing transformer |

| transformer | primary winding | secondary winding |
|---|---|---|
| X1 | X1-1 | X1-2 |
| X2 | X2-1 | X2-2 |
| X3 | X3-1 | X3-2 |
| X4 | X4-1 | X4-2 |
| X5 | X5-1 | X5-2 |
| X6 | X6-1 | X6-2 |
| X7 | X7-1 | X7-2 |

The invention claimed is:

1. A pulse width modulated switch mode DC-DC boost converter comprising at least one first electronic circuit on an input side (1) and a second electronic circuit on an output side (2), the input side (1) and the output side (2) being coupled via at least two power transformers (T1, T2), each power transformer (T1, T2) comprising a first winding (T1a, T2a) arranged in an input side converter stage (3, 4) on the input side (1) and a second winding (T1b, T2b) arranged in an output side converter stage (5) on the output side (2), each of the windings (T1a, T1b, T2a, T2b) having a first end and a second end, wherein
the first electronic circuit comprising:
terminals (AO, A1) for connecting a source or a load,
at least one energy storage inductor (L) coupled in series with at least one of the first windings (T1a, T2a) of the power transformers (T1, T2),
for each power transformer (T1, T2), an arrangement of switches being adapted to switch the current through the first winding (T1a, T2a) between a first ON-state, a first OFF-state, a second ON-state with a polarity opposite to the first ON-state, and a second OFF-state, the switches activated by means of a control circuit controlling at least one of the time, frequency and duty cycle of the switches to assume an ON-state or an OFF-state, and wherein the control circuit activates the switches such that
the at least one energy storage inductor (L) is charged when all switches of the switching arrangements are conducting, and
the second electronic circuit comprising:
terminals (BO, B1) for connecting a load or a source,
a single arrangement of switches being adapted to switch the current through the second windings (T1b, T2b) of the power transformers (T1, T2) between a first ON-state, a first OFF-state, a second ON-state with a polarity opposite to the first ON-state, and a second OFF-state, or being adapted to provide rectified current to the terminals (BO, B1), and
wherein the second windings (T1b, T2b) of the power transformers (T1, T2) are connected in series and coupled via the single arrangement of switches of the second circuit to the terminals (BO, B1) of the output side.

2. Converter according to claim 1, wherein the pulse width modulated switch mode DC-DC boost converter is controlled via the arrangement of switches on the input side (1).

3. Converter according to claim 1, wherein the arrangement of switches being adapted to switch the current through the first windings comprises two parallel coupled stages, each of the parallel coupled connections comprising a first switch serial connected to a second switch, and wherein the first end of the first winding is coupled to the serial connection of one of the two parallel coupled stages, and wherein the second end of the first winding is coupled to the serial connection of the other of the two parallel coupled stages.

4. Converter according to claim 1, wherein the input side converter stages (3, 4) are provided as modulating input stages and the output side converter stage (5) is provided as a rectifying output stage.

5. Converter according to claim 4, wherein the modulating input stages (3, 4) are connected in parallel to the common input terminals (AO, A1) and wherein the arrangement of switches in each of the modulating input stages (3, 4) is a full-bridge arrangement of switches, alternative a push-pull boost arrangement of switches, or alternative a two-inductor boost arrangement of switches.

6. Converter according to claim 1, wherein the input side converter stages (3, 4) are connected in parallel to a common pair of terminals (AO, A1).

7. Converter according to claim 1, wherein each of the input side converter stages (3, 4) comprises at least one energy storage inductor (L1, L2) connected in series with the first winding (T1a, T2a) of said input side converter stage (3, 4).

8. Converter according to claim 7, wherein at least two energy storage inductors (L1-1, L1-2), each being arranged in a different input side converter stage (3, 4), are at least pair-wise magnetically coupled via a common magnetic core.

9. Converter according to claim 1, wherein the at least one energy storage inductor L is provided as a common energy storage inductor for the power transformers (T1, T2).

10. Converter according to claim 1, wherein the single arrangement of switches in the output stage (5) is provided by diodes in a rectifying full-bridge arrangement.

11. Converter according to claim 1, wherein the converter further is adapted for operation as a bidirectional converter.

12. Converter according to claim 11, wherein all arrangements of switches are provided by switches in a full-bridge configuration.

13. Converter according to claim 1, further comprising a capacitor (C) connecting the terminals (AO, A1) on the input side (1) or a capacitor (C) connecting the terminals (BO, B1) on the output side (2).

14. A pulse width modulated switch mode DC-DC boost converter comprising at least one first electronic circuit on an input side (1) and a second electronic circuit on an output side (2), the input side (1) and the output side (2) being coupled via at least two power transformers (T1, T2), each power transformer (T1, T2) comprising a first winding (T1a, T2a) arranged in an input side converter stage (3, 4) on the input side (1) and a second winding (T1 b, T2b) arranged in an output side converter stage (5) on the output side (2), each of the windings (T 1a, T1 b, T2a, T2b) having a first end and a second end, wherein
the first electronic circuit comprising:
terminals (AO, A1) for connecting a source or a load,
at least one energy storage inductor (L) coupled in series with at least one of the first windings (T1a, T2a) of the power transformers (T1, T2),
for each power transformer (T1, T2), an arrangement of switches being adapted to switch the current through the first winding (T1a, T2a) between a first ON-state, a first OFF-state, a second ON-state with a polarity opposite to the first ON-state, and a second OFF-state, and wherein
the at least one energy storage inductor (L) is charged when all switches of the switching arrangements are conducting, and
the second electronic circuit comprising:
terminals (BO, B1) for connecting a load or a source,
a single arrangement of switches being adapted to switch the current through the second windings (T1 b, T2b) of the power transformers (T1, T2) between a first ON-state, a first OFF-state, a second ON-state with a polarity opposite to the first ON-state, and a second OFF-state, or being adapted to provide rectified current to the terminals (BO, B 1), and
wherein the second windings (T1b, T2b) of the power transformers (T1, T2) are connected in series and coupled via the single arrangement of switches of the second circuit to the terminals (BO, B1) of the output side,
and wherein the at least one energy storage inductor (L) is coupled to or is part of a current-balancing electrical circuit.

15. A pulse width modulated switch mode DC-DC boost converter comprising at least one first electronic circuit on an input side (1) and a second electronic circuit on an output side (2), the input side (1) and the output side (2) being coupled via at least two power transformers (T1, T2), each power transformer (T1, T2) comprising a first winding (T1a, T2a) arranged in an input side converter stage (3, 4) on the input side (1) and a second winding (T1 b, T2b) arranged in an output side converter stage (5) on the output side (2), each of the windings (T 1a, T1 b, T2a, T2b) having a first end and a second end, wherein
the first electronic circuit comprises:
terminals (AO, A1) for connecting a source or a load,
at least one energy storage inductor (L) coupled in series with at least one of the first windings (T1a, T2a) of the power transformers (T1, T2),
for each power transformer (T1, T2), an arrangement of switches being adapted to switch the current through the first winding (T1a, T2a) between a first ON-state, a first OFF-state, a second ON-state with a polarity opposite to the first ON-state, and a second OFF-state, and wherein
the at least one energy storage inductor (L) is charged when all switches of the switching arrangements are conducting, and
the second electronic circuit comprises:
terminals (BO, B1) for connecting a load or a source,
a single arrangement of switches being adapted to switch the current through the second windings (T1 b, T2b) of the power transformers (T1, T2) between a first ON-state, a first OFF-state, a second ON-state with a polarity opposite to the first ON-state, and a second OFF-state, or being adapted to provide rectified current to the terminals (BO, B1),
and wherein the second windings (T1b, T2b) of the power transformers (T1, T2) are connected in series and coupled via the single arrangement of switches of the second circuit to the terminals (BO, B1) of the output side,
further comprising at least one current balancing transformer (X1) on the input side, said current balancing transformer (X1) comprising:
at least one primary winding (X 1-1) provided in a primary branch (6) in series with the arrangement of switches of a first converter stage (3) on the input side (1),
at least one secondary winding (X1-2) provided in a secondary branch (7) in series with the arrangement of switches of a further input side converter stage (4),
wherein the primary windings (X1-1) and the secondary windings (X1-2) are arranged with opposite polarity to magnetically couple the primary branch (6) and the secondary branch (7) so as to induce opposite currents in the coupled branches (6, 7), thereby pair-wise balancing the current distribution between the coupled branches (6, 7) at a predetermined current balancing ratio.

16. Converter according to claim 15, wherein the converter comprises:
- an even number N=2n of the power transformers (T1, T2, ... ), where n is an integer number greater than one, and
- a cascading arrangement of a number M=(2n−1) of the current balancing transformers (X1, X2, ... ) arranged to successively balance the current through the first windings (T1a, T2a, ... ) of the N power transformers (T1, T2, ... ) in cascading pairs of coupled branches, wherein each of the current balancing transformers (T1, T2, ... ) provides a current balancing ratio of 1:1.

17. Converter according to claim 15, wherein the converter comprises:
- an uneven number P=(2n+1) of the power transformers (T1, T2, ... ), where n is an integer number greater than or equal to one, and
- a cascading arrangement of a number Q=2n of the current balancing transformers (X1, X2, ... ) arranged to successively balance the current through the first windings (T1a, T2a, ... ) of the N power transformers (T1, T2, ... ) in cascading pairs of coupled branches, wherein at least one of the current balancing transformers provides a current balancing ratio of 2:1.

* * * * *